(12) United States Patent
Rose et al.

(10) Patent No.: US 8,186,155 B2
(45) Date of Patent: May 29, 2012

(54) HYDRAULIC ENERGY STORAGE SYSTEM WITH ACCUMULATOR AND METHOD OF VARYING CHARGE OF SAME

(75) Inventors: Kenric B. Rose, Howell, MI (US); William G. Spadafora, Clarkston, MI (US)

(73) Assignee: Robert Bosch GmbH, Stuttgart (DE)

( * ) Notice: Subject to any disclaimer, the term of this patent is extended or adjusted under 35 U.S.C. 154(b) by 744 days.

(21) Appl. No.: 12/362,980

(22) Filed: Jan. 30, 2009

(65) Prior Publication Data
US 2010/0192563 A1   Aug. 5, 2010

(51) Int. Cl.
*F16D 31/02*   (2006.01)
*F15B 11/072*   (2006.01)

(52) U.S. Cl. .............. 60/414; 60/415; 91/4 R
(58) Field of Classification Search .......... 60/414, 60/415; 91/4 R, 4 A
See application file for complete search history.

(56) References Cited

U.S. PATENT DOCUMENTS

| | | | |
|---|---|---|---|
| 3,665,788 A | 5/1972 | Nyman | |
| 3,695,731 A | 10/1972 | England et al. | |
| 3,917,027 A | 11/1975 | Hakanson et al. | |
| 4,064,694 A | 12/1977 | Baudoin | |
| 4,098,144 A | 7/1978 | Besel et al. | |
| 4,132,283 A | 1/1979 | McCurry | |
| 4,199,950 A | 4/1980 | Hakanson et al. | |
| 4,227,587 A | 10/1980 | Carman | |
| 4,235,216 A | 11/1980 | Miles | |
| 4,347,813 A | 9/1982 | Maucher et al. | |
| 4,350,220 A | 9/1982 | Carman | |
| 4,351,152 A | 9/1982 | Reynolds et al. | |
| 4,373,332 A | 2/1983 | Holmen | |
| 4,406,951 A | 9/1983 | Inoue | |
| 4,441,573 A | 4/1984 | Carman et al. | |
| 4,487,173 A | 12/1984 | Maucher et al. | |
| 4,534,169 A | 8/1985 | Hunt | |
| 4,543,923 A | 10/1985 | Hamano et al. | |
| 4,580,534 A | 4/1986 | Blum et al. | |
| 4,741,410 A | 5/1988 | Tunmore | |
| 4,798,086 A | 1/1989 | Styfhoorn | |
| 4,813,510 A | 3/1989 | Lexen | |
| 5,088,041 A | 2/1992 | Tanaka et al. | |
| 5,103,671 A | 4/1992 | Dyvig | |
| 5,152,142 A | 10/1992 | Budzich | |
| 5,310,017 A | 5/1994 | Tobias | |

(Continued)

FOREIGN PATENT DOCUMENTS

DE   102007012130   11/2007
(Continued)

OTHER PUBLICATIONS

International Search Report and Written Opinion for PCT/US2009/069683, dated Apr. 26, 2010, 11 pages.

(Continued)

*Primary Examiner* — Daniel Lopez
(74) *Attorney, Agent, or Firm* — Michael Best & Friedrich LLP

(57) ABSTRACT

A method of varying a charge in an accumulator includes providing an accumulator containing working fluid and gas, providing a reservoir containing gas, transferring gas from the reservoir to the accumulator to increase the gas pressure in the accumulator, and transferring gas from the accumulator to the reservoir to decrease the gas pressure in the accumulator.

16 Claims, 2 Drawing Sheets

U.S. PATENT DOCUMENTS

| | | | |
|---|---|---|---|
| 5,404,717 A | 4/1995 | Nogi et al. | |
| 5,492,189 A | 2/1996 | Kriegler | |
| 5,507,144 A | 4/1996 | Gray, Jr. et al. | |
| 5,802,638 A * | 9/1998 | Parker et al. | 91/4 A |
| 5,823,281 A | 10/1998 | Yamaguchi et al. | |
| 6,054,776 A | 4/2000 | Sumi | |
| 6,135,913 A | 10/2000 | Lyon | |
| 6,139,458 A | 10/2000 | Simmons | |
| 6,170,587 B1 | 1/2001 | Bullock | |
| 6,454,033 B1 | 9/2002 | Nathan et al. | |
| 6,460,500 B1 | 10/2002 | Ooyana et al. | |
| 6,481,329 B2 | 11/2002 | Porter | |
| 6,543,311 B1 | 4/2003 | Baginski et al. | |
| 6,615,786 B2 | 9/2003 | Mori et al. | |
| 6,705,266 B2 | 3/2004 | Tachikawa et al. | |
| 6,712,166 B2 | 3/2004 | Rush et al. | |
| 6,719,080 B1 | 4/2004 | Gray, Jr. | |
| 6,736,099 B2 | 5/2004 | Mori et al. | |
| 6,962,050 B2 | 11/2005 | Hiraki et al. | |
| 7,044,257 B2 | 5/2006 | Kempf et al. | |
| 7,086,226 B2 | 8/2006 | Oguri | |
| 7,117,836 B2 | 10/2006 | Foster | |
| 7,147,078 B2 | 12/2006 | Teslak et al. | |
| 7,273,122 B2 | 9/2007 | Rose | |
| 7,296,407 B2 | 11/2007 | Rose | |
| 2002/0166530 A1 | 11/2002 | Tachikawa et al. | |
| 2002/0166532 A1 | 11/2002 | Mori et al. | |
| 2003/0000492 A1 | 1/2003 | Mori et al. | |
| 2003/0103850 A1 | 6/2003 | Szulczewski | |
| 2003/0173133 A1 | 9/2003 | Kempt et al. | |
| 2005/0036894 A1 | 2/2005 | Oguri | |
| 2006/0053790 A1 | 3/2006 | Foster | |
| 2006/0068970 A1 | 3/2006 | Rose | |
| 2006/0079375 A1 | 4/2006 | Marshall et al. | |
| 2006/0157010 A1 | 7/2006 | Moriwaki et al. | |
| 2007/0018499 A1 | 1/2007 | Kokubo et al. | |
| 2007/0111849 A1 | 5/2007 | Ji | |

FOREIGN PATENT DOCUMENTS

| | | |
|---|---|---|
| DE | 102007032316 | 1/2009 |
| FR | 2467095 | 4/1981 |
| JP | 61042247 | 2/1986 |
| JP | 01035102 | 2/1989 |
| JP | 3262726 | 11/1991 |
| WO | 00/02743 | 1/2000 |
| WO | 02/095243 | 11/2002 |
| WO | 2006055978 | 5/2006 |
| WO | 2007079642 | 7/2007 |
| WO | 2007/124882 | 11/2007 |
| WO | 2008/045468 | 4/2008 |

OTHER PUBLICATIONS

Spirax Sarco, "Isolation Valves—Rotary Movement," 14 pages, printed from web site www.spiraxsarco.com on Jun. 10, 2008.

Spirax Sarco, "Control Valve Actuators and Positioners," 23 pages, printed from web site www.spiraxsarco.com on Jun. 10, 2008.

Bosch Rexroth Corporation, "Variable Displacement Pump Axial Piston—Swashplate Design," Model A4VSO specification sheet, 7 pages, admitted prior art.

Hewko, L. O., et al., "Hydraulic Energy Storage Based Hybrid Propulsion System for a Terrestrial Vehicle" research paper, Aug. 12, 1990, pp. 99-105.

* cited by examiner

HYDRAULIC ENERGY STORAGE SYSTEM WITH ACCUMULATOR AND METHOD OF VARYING CHARGE OF SAME

FIELD OF THE INVENTION

The present invention relates to a hybrid drive system for vehicles, and more particularly to hybrid hydraulic drive systems.

BACKGROUND OF THE INVENTION

A typical hybrid hydraulic drive system uses a reversible pump/motor to either store power from or add power to a conventional vehicle drive system. The system stores power by pumping hydraulic fluid from a low pressure reservoir into a hydraulic energy storage system. This hydraulic energy storage system typically consists of one or more nitrogen-charged hydraulic accumulators. In many cases the hydraulic energy storage system can also absorb power and reject it into the atmosphere as waste heat energy rather than storing it. Hybrid hydraulic drive systems typically add power to conventional vehicle drive systems by utilizing the hydraulic energy stored in the hydraulic accumulator to drive the reversible pump/motor as a motor.

SUMMARY OF THE INVENTION

The present invention provides, in one aspect, a method of varying a charge in an accumulator. The method includes providing an accumulator containing working fluid and gas, providing a reservoir containing gas, transferring gas from the reservoir to the accumulator to increase the gas pressure in the accumulator, and transferring gas from the accumulator to the reservoir to decrease the gas pressure in the accumulator.

The present invention provides, in another aspect, an energy storage system including a first reservoir containing working fluid, a reversible pump/motor in fluid communication with the first reservoir, and an accumulator containing working fluid and gas. The accumulator is in selective fluid communication with the reversible pump/motor to deliver pressurized working fluid to the reversible pump/motor when operating as a motor, and to receive pressurized working fluid discharged by the reversible pump/motor when operating as a pump. The energy storage system also includes a second reservoir containing gas in selective fluid communication with the accumulator, and a pump in fluid communication with the accumulator and the second reservoir. The pump is operable in at least one direction to transfer gas between the second reservoir and the accumulator to change the gas pressure in the accumulator.

The present invention provides, in another aspect, an energy storage system including a first reservoir containing working fluid, a reversible pump/motor in fluid communication with the reservoir, and an accumulator containing working fluid and gas. The accumulator is in selective fluid communication with the reversible pump/motor to deliver pressurized working fluid to the reversible pump/motor when operating as a motor, and to receive pressurized fluid discharged by the reversible pump/motor when operating as a pump. The energy storage system also includes a second reservoir containing gas in selective fluid communication with the accumulator, and a piston positioned in the second reservoir. The piston is moveable in the second reservoir from a first position to a second position to transfer gas from the second reservoir to the accumulator to increase the gas pressure in the accumulator. The piston is also moveable in the second reservoir from the second position to the first position to allow gas from the accumulator to return to the second reservoir to decrease the gas pressure in the accumulator.

Other features and aspects of the invention will become apparent by consideration of the following detailed description and accompanying drawings.

Before any constructions of the invention are explained in detail, it is to be understood that the invention is not limited in its application to the details of construction and the arrangement of components set forth in the following description or illustrated in the accompanying drawings. The invention is capable of other constructions and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
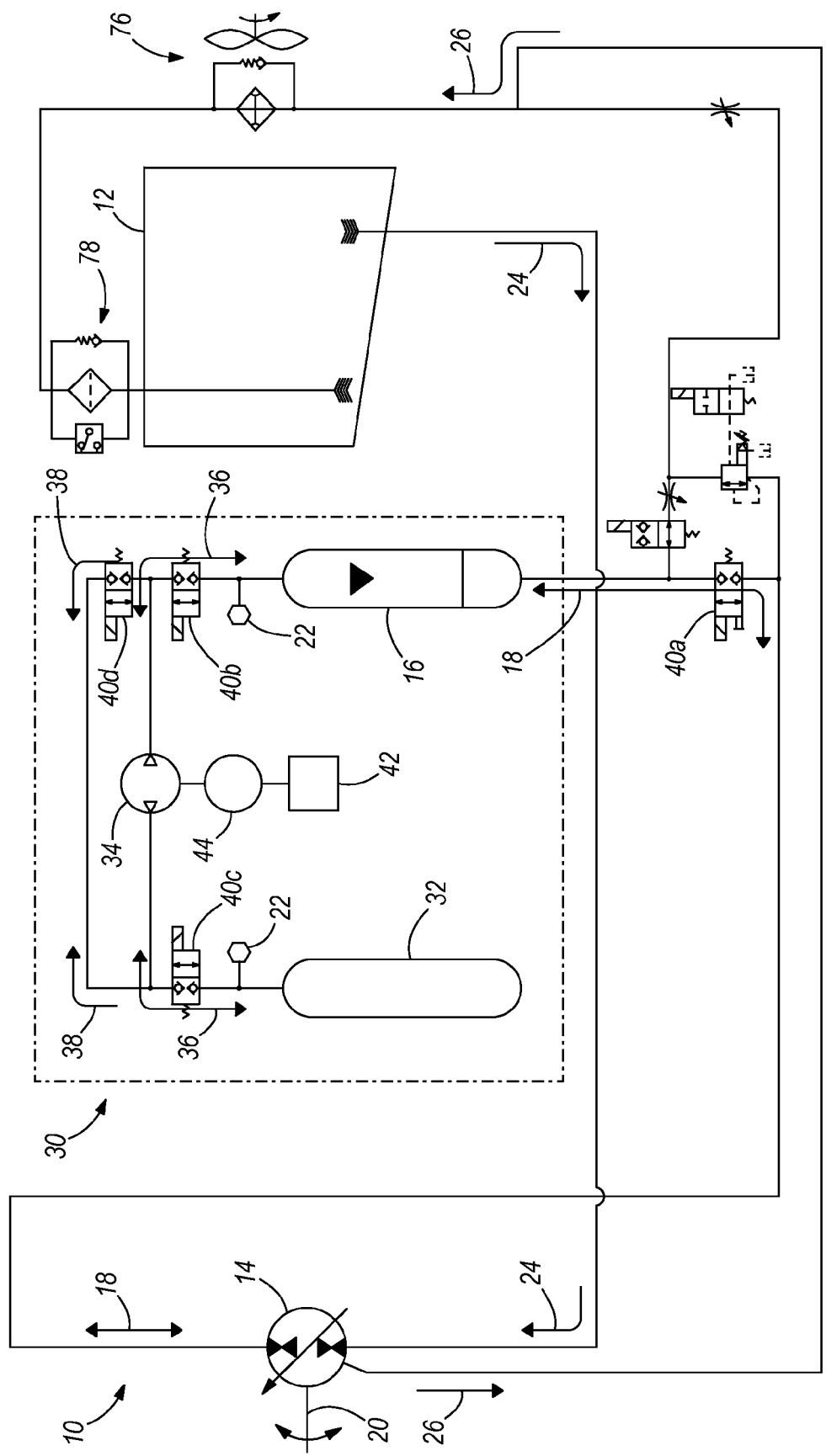
FIG. 1 is a schematic of a first construction of an energy storage system of the present invention.

FIG. 1 schematically illustrates an energy storage system 10 including a reservoir 12 containing working fluid (e.g., hydraulic fluid, etc.), a reversible pump/motor 14 in fluid communication with the reservoir 12 via a supply flow path 24 and a return flow path 26, and a variable accumulator charge system 30. In the illustrated construction of the energy storage system 10, the system 10 is coupled to a driveline 20 of a vehicle (not shown) to absorb or store kinetic energy from the driveline 20 and to deliver or transfer energy to the driveline 20 to power the driveline 20. Alternatively, the system 10 may be coupled to any of a number of different mechanisms with which the system 10 can interact to store and transfer energy. Further, the variable accumulator charge system 30 may be incorporated in other systems using an accumulator to store energy.

With continued reference to FIG. 1, the variable accumulator charge system 30 includes an accumulator 16 containing working fluid and gas (e.g., nitrogen, etc.), a reservoir 32 containing an additional supply of gas, and a pump 34 in fluid communication with the accumulator 16 and the reservoir 32. The accumulator 16 is in selective fluid communication with the reversible pump/motor 14 via a bi-directional flow path 18. An isolation valve 40a (e.g., a ball valve, spool valve, poppet valve, gate valve, etc.) is positioned in the flow path 18 to selectively isolate the accumulator 16 from the reversible pump/motor 14. The type of accumulator 16 can vary depending on the application of the energy storage system 10 (e.g., diaphragm, bladder, floating piston, etc.). In FIG. 1, the reservoir 32 is configured as a single, fixed-volume pressure vessel. Alternatively the reservoir 32 may be configured as a variable-volume pressure vessel (e.g, a bladder that can be squeezed). Further, the reservoir 32 may be configured as an assembly of interconnected pressure vessels. The reservoir 32 may be made of any of a number of different materials depending on the application of the energy storage system 10 (e.g., steel, aluminum, plastic, carbon-fiber composite, etc.). The volume of the reservoir 32 can vary depending on the application of the energy storage system 10. The type of pump 34 can also vary depending on the application of the energy storage system 10 (e.g., vane, piston, scroll, rotary gear, etc.).

With continued reference to FIG. 1, the variable accumulator charge system 30 includes a primary flow path 36, in which the pump 34 is positioned between the accumulator 16 and the reservoir 32. Respective isolation valves 40*b*, 40*c* are positioned in the primary flow path 36 between the pump 34 and the accumulator 16, and between the pump 34 and the reservoir 32. The system 30 also includes a bypass flow path 38 between the accumulator 16 and the reservoir 32 fluidly connected in parallel with the primary flow path 36. Another isolation valve 40*d* is positioned in the bypass flow path 38 between the accumulator 16 and the reservoir 32.

With continued reference to FIG. 1, a motor 44 is operably coupled to the pump 34 to operate or drive the pump 34. The type of motor 44 may vary depending on the application of the energy storage system 10 (e.g., an electric motor, a hydraulic motor, etc.). A control unit 42 is operably coupled to the motor 44 to selectively activate and deactivate the motor 44. The control unit 42 may be operably coupled to the motor 44 using a variety of technologies (e.g., by a wired connection, by a wireless connection, etc.). The control unit 42 may be dedicated to controlling the motor 44, or the control unit 42 may be used to control the motor 44 in addition to controlling other devices (e.g., other components or devices within the energy storage system 10, other components or devices within a vehicle incorporating the energy storage system 10, etc.).

With continued reference to FIG. 1, respective sensors 22 are positioned in the primary flow path 36 between the accumulator 16 and the isolation valve 40*b*, and between the reservoir 32 and the isolation valve 40*c*. The sensors 22 are configured to sense or detect the pressure in the respective accumulator 16 and reservoir 32. The sensors 22 are also operably coupled to the control unit 42 to provide information relating to the pressure in each of the accumulator 16 and the reservoir 32 to the control unit 42. The sensors 22 may be operably coupled to the control unit 42 using a variety of technologies (e.g., by a wired connection, by a wireless connection, etc.). Alternatively, the sensors 22 may be configured to detect a variety of other conditions (e.g., flow rate, temperature, etc.).

With continued reference to FIG. 1, when the vehicle (not shown) undergoes braking or another operation where driveline energy may be absorbed and stored, the reversible pump/motor 14 functions as a pump driven by the vehicle's driveline 20. The reversible pump/motor 14 receives low pressure working fluid from the reservoir 12 via the supply flow path 24 and pressurizes the working fluid. The resultant high pressure working fluid exits the reversible pump/motor 14, flows through the isolation valve 40*a*, and flows into the accumulator 16 via the path 18. As the pressurized working fluid flows into the accumulator 16, the piston, diaphragm, or other structure separating the gas from the working fluid is displaced upwardly, thereby compressing the gas in the accumulator 16. The isolation valve 40*a* is subsequently closed to maintain the gas and working fluid in the accumulator 16 at a high pressure. The work performed by the piston, diaphragm, or other structure to compress the gas is stored for later use to power the driveline 20.

When the vehicle (not shown) undergoes acceleration or another operation where propulsion assistance is needed, the reversible pump/motor 14 functions as a motor. The compressed gas acts on the piston, diaphragm, or other structure in the accumulator 16, thereby maintaining the working fluid at a high pressure. Upon opening the isolation valve 40*a*, high pressure working fluid flows from the accumulator 16 and into the reversible pump/motor 14, via the path 18, to drive the reversible pump/motor 14 and the driveline 20, thereby assisting the vehicle's acceleration or other energy-expending operation. Low pressure working fluid exits the reversible pump/motor 14, flows through the return flow path 26, through a heat exchanger 76 and a filter 78 positioned in the return flow path 26, and is subsequently returned to the reservoir 12. The reservoir 12 may include a breather to allow entry of replacement air into the reservoir 12 during discharge of working fluid from the reservoir 12, and to allow the escape of air above the working fluid in the reservoir 12 during filling of the reservoir 12 with working fluid.

With continued reference to FIG. 1, in operation of the variable accumulator charge system 30, the pump 34 transfers gas between the reservoir 32 and the accumulator 16 via the primary flow path 36 to change the gas pressure in the accumulator 16. Varying the charge or gas pressure of the accumulator 16 allows the system 30 to adjust for varying operating conditions of a vehicle incorporating the system 30 and achieve maximum system performance (e.g., for maximum fuel saving, maximum power, maximum emissions reduction, etc.). To change the gas pressure in the accumulator 16, the isolation valves 40*b*, 40*c* positioned in the primary flow path 36 are opened by the control unit 42 (e.g., by a wired or wireless connection).

More specifically, each of the valves 40*b*, 40*c* may include an actuator (e.g., a solenoid) operable to open and close the valves 40*b*, 40*c* upon command by the control unit 42. To increase the gas pressure in the accumulator 16, the control unit 42 activates the motor 44, which, in turn, operates the pump 34 to transfer gas from the reservoir 32 to the accumulator 16 via the primary flow path 36. The control unit 42 may utilize the pressure information provided by the sensors 22 to determine when the charge or gas pressure in the accumulator 16 has reached its new increased or decreased value. The control unit 42 may then stop the motor 44 and close the isolation valves 40*b*, 40*c* in the flow path 36 after the transfer of gas from the reservoir 32 to the accumulator 16 is complete. Gas pressure in the accumulator 16 may also be increased by venting the gas in the reservoir 32 to the accumulator 16 via the bypass flow path 38 when the gas pressure in the reservoir 32 is greater than the gas pressure in the accumulator 16. For this to occur, the control unit 42 opens the isolation valves 40*b*, 40*c*, 40*d* in both of the flow paths 36, 38.

To decrease the gas pressure in the accumulator 16, the control unit 42 activates the motor 44, which, in turn, operates the pump 34 to transfer gas from the accumulator 16 to the reservoir 32 via the primary flow path 36. The control unit 42 may utilize the pressure information provided by the sensors 22 in a similar manner as described above in determining when to stop the motor 44 and close the valves 40*b*, 40*c* in the flow path 36. Gas pressure in the accumulator 16 may also be decreased by venting the gas in the accumulator 16 to the reservoir 32 via the bypass flow path 38 when the gas pressure in the accumulator 16 is greater than the gas pressure in the reservoir 32. For this to occur, the control unit 42 opens the isolation valves 40*b*, 40*c*, 40*d* in both of the flow paths 36, 38.

Figure 2:
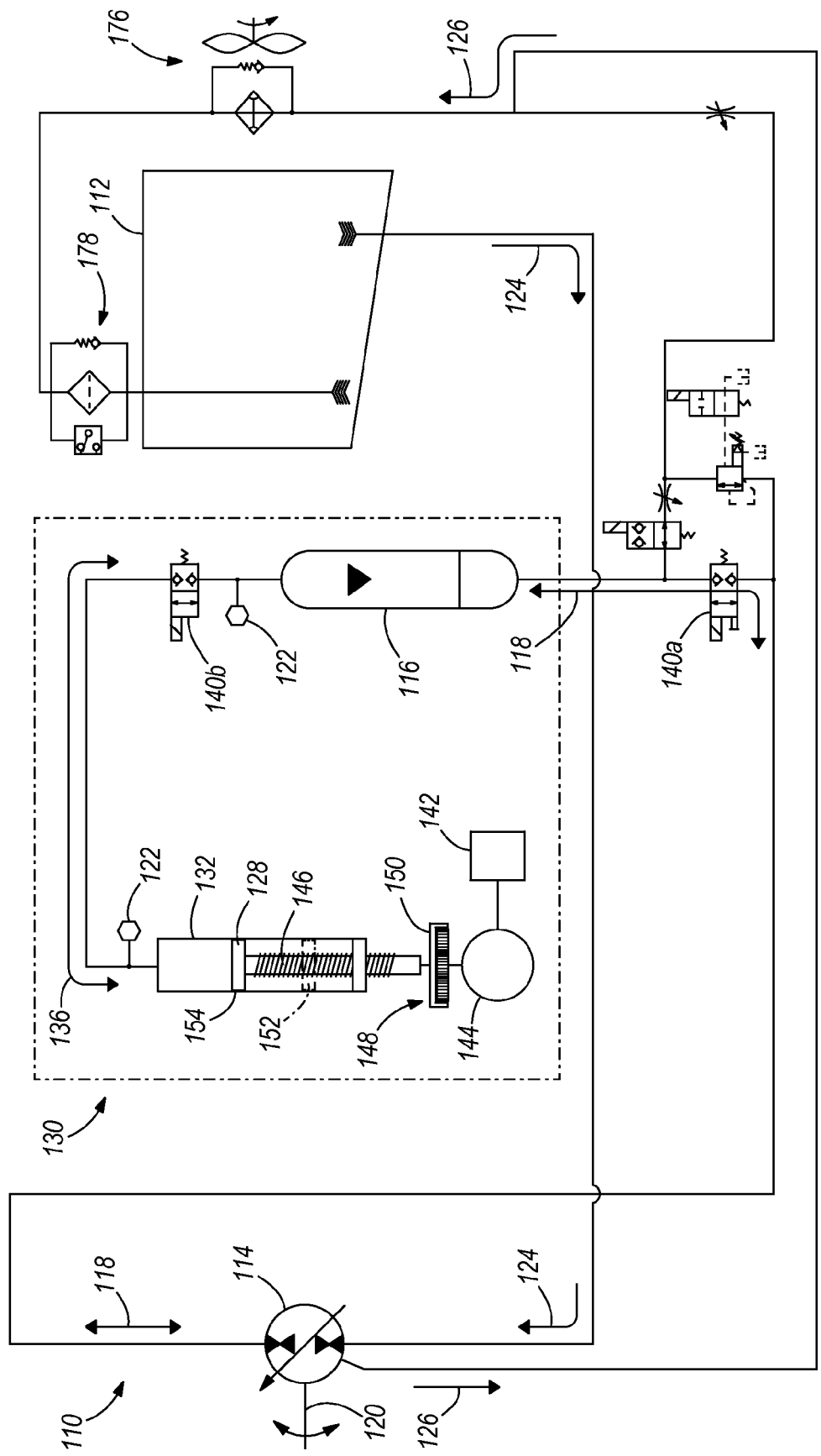
FIG. 2 is a schematic of a second construction of an energy storage system of the present invention.

FIG. 2 schematically illustrates a second construction of the energy storage system 110 according to the present invention. The energy storage system 110 illustrated in FIG. 2 is similar to the system 10 illustrated by FIG. 1 and described above. As such, like components are labeled with like reference numerals plus "100."

FIG. 2 schematically illustrates an energy storage system 110 including a reservoir 112 containing working fluid, a reversible pump/motor 114 in fluid communication with the reservoir 112 via a supply flow path 124 and a return flow path 126, and a variable accumulator charge system 130. In the illustrated construction of the energy storage system 110, the system 110 is coupled to a driveline 120 of a vehicle (not shown) to store or absorb kinetic energy from the driveline 120 and to deliver or transfer energy to the driveline 120 to power the driveline 120.

With continued reference to FIG. 2, the variable accumulator charge system 130 includes an accumulator 116 containing working fluid and gas in selective fluid communication with a reservoir 132 containing an additional supply of gas and a piston 128 positioned in the reservoir 132. The accumulator 116 is in selective fluid communication with the reversible pump/motor 114 via a bi-directional flow path 118. An isolation valve 140a is positioned in the flow path 118 to selectively isolate the accumulator 116 from the reversible pump/motor 114. The variable accumulator charge system 130 also includes a flow path 136 between the accumulator 116 and the reservoir 132. Another isolation valve 140b is positioned in the flow path 136 between the accumulator 116 and the reservoir 132.

With continued reference to FIG. 2, a control unit 142 is operably coupled to the piston 128 to selectively move the piston 128 within the reservoir 132. An actuator 148 is operably coupled to the piston 128 to move the piston 128 within the reservoir 132. The type of actuator 148 may vary depending on the application of the energy storage system 110 (e.g., an electro-mechanical linear actuator, a pneumatic actuator, a hydraulic actuator, etc.). As the actuator 148 is shown in FIG. 2, the actuator 148 is configured as a screw 146 coupled to the reservoir 132 and supported for rotation relative to the reservoir 132 (e.g., by one or more bushings, bearings, etc.), a motor 144, and a transmission 150 interconnecting the screw 146 and the motor 148. The piston 128 is configured with a threaded aperture that receives the screw 146 and allows the piston 128 to move along the screw 146 as the screw 146 is rotated. Alternatively, the piston 128 may be secured to the distal end of the screw 146, and the screw 146 may be threadably coupled to the reservoir 132. The type of motor 144 may vary depending on the application of the energy storage system 110 (e.g., an electric motor, a hydraulic motor, etc.). The type of transmission 150 may also vary depending on the application of the energy storage system 110 (e.g., a geared, chain drive or continuously variable transmission).

With continued reference to FIG. 2, respective sensors 122 are positioned in the primary flow path 136 between the accumulator 116 and the isolation valve 140b, and between the reservoir 132 and the isolation valve 140b. The sensors 122 are configured to sense or detect the pressure in the respective accumulator 116 and reservoir 132. The sensors 122 are also operably coupled to the control unit 142 to provide information relating to the pressure in each of the accumulator 116 and the reservoir 132 to the control unit 142. The sensors 122 may be operably coupled to the control unit 142 using a variety of technologies (e.g., by a wired connection, by a wireless connection, etc.). Alternatively, the sensors 122 may be configured to detect a variety of other conditions (e.g., flow rate, temperature, etc.).

With continued reference to FIG. 2, when the vehicle (not shown) undergoes braking or another operation where driveline energy may be absorbed and stored, the reversible pump/motor 114 functions as a pump driven by the vehicle's driveline 120. The reversible pump/motor 114 receives low pressure working fluid from the reservoir 112 via the supply flow path 124 and pressurizes the working fluid. The resultant high pressure working fluid exits the reversible pump/motor 114, flows through the isolation valve 140a, and flows into the accumulator 116 via the path 118. As the pressurized working fluid flows into the accumulator 116, the piston, diaphragm, or other structure separating the gas from the working fluid is displaced upwardly, thereby compressing the gas in the accumulator 116. The isolation valve 140a is subsequently closed to maintain the gas and working fluid in the accumulator 116 at a high pressure. The work performed by the piston, diaphragm, or other structure to compress the gas is stored for later use to power the driveline 120.

When the vehicle (not shown) undergoes acceleration or another operation where propulsion assistance is needed, the reversible pump/motor 114 functions as a motor. The compressed gas acts on the piston, diaphragm, or other structure in the accumulator 116, thereby maintaining the working fluid at a high pressure. Upon opening the isolation valve 140a, high pressure working fluid flows from the accumulator 116 and into the reversible pump/motor 114, via the path 118, to drive the reversible pump/motor 114 and the driveline 120, thereby assisting the vehicle's acceleration or other energy-expending operation. Low pressure working fluid exits the reversible pump/motor 114, flows through the return flow path 126, through a heat exchanger 176 and a filter 178 positioned in the return flow path 126, and is subsequently returned to the reservoir 112. The reservoir 112 may include a breather to allow entry of replacement air into the reservoir 112 during discharge of working fluid from the reservoir 112, and to allow the escape of air above the working fluid in the reservoir 112 during filling of the reservoir 112 with working fluid.

With continued reference to FIG. 2, in operation of the variable accumulator charge system 130, the movement of the piston 128 between a first position (shown in phantom) and a second position (shown in solid) transfers gas between the reservoir 132 and the accumulator 116 via the flow path 136 to change the gas pressure in the accumulator 116. Varying the charge or gas pressure of the accumulator 116 allows the system 130 to adjust for varying operating conditions of a vehicle incorporating the system 130 and achieve maximum system performance (e.g., for maximum fuel saving, maximum power, maximum emissions reduction, etc.). To change the gas pressure in the accumulator 116, the isolation valve 140b positioned in the flow path 136 is opened. In the illustrated construction of the system 130, the control unit 142 may communicate with the isolation valve 140b (e.g., by a wired or wireless connection) to open the valve 140b positioned in flow path 136. More specifically, the valve 140b may include an actuator (e.g., a solenoid) operable to open and close the valve 140b upon command by the control unit 142.

Next, the control unit 142 activates the motor 144, which, in turn, drives or rotates the transmission 150 and the screw 146 relative to the reservoir 132. The rotation of the screw 146 moves the piston 128 along the screw 146 between the first position (shown in phantom) and the second position (shown in solid). The motion of the piston 128 from the first position (shown in phantom) to the second position (shown in solid) decreases the volume available within the reservoir 132 for the gas, causing a transfer of gas from the reservoir 132 to the accumulator 116, which ultimately increases the gas pressure in the accumulator 116. The control unit 142 may utilize the pressure information provided by the sensors 122 to determine when the charge or gas pressure in the accumulator 116 has reached its new increased value. The control unit 142 may then stop the motor 144 and close the isolation valve 140b in the flow path 136 after the transfer of gas from the reservoir 132 to the accumulator 116 is complete.

The motion of the piston 128 from the second position (shown in solid) to the first position (shown in phantom) increases the volume available within the reservoir 132 for the gas, allowing gas to move from the accumulator 116 and expand into the reservoir 132, which ultimately decreases the gas pressure in the accumulator 116. The control unit 142 may utilize the pressure information provided by the sensors 122 to determine when the charge or gas pressure in the accumulator 116 has reached its new decreased value. The control unit 142 may then stop the motor 144 and close the isolation valve 140b in the flow path 136 after the transfer of gas from the accumulator 116 to the reservoir 132 is complete.

Alternative methods of changing the volume of the reservoir 132 to cause the transfer of gas between the reservoir 132 and the accumulator 116 can also be employed. For example, the reservoir 132 may be configured as a bladder that is squeezed to decrease the internal volume of the bladder.

Various features of the invention are set forth in the following claims.

What is claimed is:

1. A method of operating an energy storage system, the method comprising:
   providing a reversible pump/motor;
   providing an accumulator containing pressurized working fluid and gas;
   delivering the pressurized working fluid to the reversible pump/motor when operating as a motor;
   receiving in the accumulator pressurized working fluid discharged by the reversible pump/motor when operating as a pump;
   providing a reservoir containing gas;
   transferring gas from the reservoir to the accumulator through an isolation valve to increase the gas pressure in the accumulator; and
   transferring gas from the accumulator to the reservoir to decrease the gas pressure in the accumulator;
   wherein transferring gas from the reservoir to the accumulator includes decreasing the volume of the reservoir.

2. The method of claim 1, wherein decreasing the volume of the reservoir includes moving a piston in the reservoir from a first position to a second position.

3. The method of claim 2, wherein transferring gas from the accumulator to the reservoir includes increasing the volume of the reservoir.

4. The method of claim 3, wherein increasing the volume of the reservoir includes moving the piston in the reservoir from the second position to the first position.

5. An energy storage system comprising:
   a first reservoir containing working fluid;
   a reversible pump/motor in fluid communication with the first reservoir;
   an accumulator containing working fluid and gas, the accumulator in selective fluid communication with the reversible pump/motor to deliver pressurized working fluid to the reversible pump/motor when operating as a motor, and to receive pressurized working fluid discharged by the reversible pump/motor when operating as a pump;
   a second reservoir containing gas and in selective fluid communication with the accumulator; and
   a pump in fluid communication with the accumulator and the second reservoir;
   wherein the pump is operable to transfer gas from the second reservoir to the accumulator to increase the gas pressure in the accumulator, and wherein the pump is operable to transfer gas from the accumulator to the second reservoir to decrease the gas pressure in the accumulator.

6. The energy storage system of claim 5, further comprising an isolation valve positioned in a flow path between the second reservoir and the accumulator, wherein the pump is positioned in the flow path between the second reservoir and the accumulator.

7. The energy storage system of claim 6, further comprising a second isolation valve positioned in a second flow path that is fluidly connected in parallel with the first flow path between the second reservoir and the accumulator.

8. The energy storage system of claim 5, further comprising a control unit operably coupled to the pump to selectively activate the pump.

9. The energy storage system of claim 8, further comprising a motor operably coupled to the pump, wherein the control unit is operably coupled to the motor to selectively activate the motor.

10. An energy storage system comprising:
    a first reservoir containing working fluid;
    a reversible pump/motor in fluid communication with the first reservoir;
    an accumulator containing working fluid and gas, the accumulator in selective fluid communication with the reversible pump/motor to deliver pressurized working fluid to the reversible pump/motor when operating as a motor, and to receive pressurized working fluid discharged by the reversible pump/motor when operating as a pump;
    a second reservoir containing gas and in selective fluid communication with the accumulator;
    an isolation valve positioned between the second reservoir and the accumulator; and
    a piston positioned in the second reservoir;
    wherein the piston is moveable in the second reservoir from a first position to a second position to transfer gas from the second reservoir to the accumulator to increase the gas pressure in the accumulator, and wherein the piston is moveable in the second reservoir from the second position to the first position to allow gas from the accumulator to return to the second reservoir to decrease the gas pressure in the accumulator.

11. The energy storage system of claim 10, further comprising a control unit operably coupled to the piston to selectively move the piston in the second reservoir.

12. The energy storage system of claim 11, further comprising an actuator operably coupled to the piston, wherein the control unit is operably coupled to the actuator to selectively move the piston in the second reservoir.

13. The energy storage system of claim 12, wherein the actuator comprises:
    a screw coupled to the second reservoir and supported for rotation relative to the second reservoir; and
    a motor operably coupled to the screw to selectively rotate the screw, wherein the piston is coupled to the screw, and wherein movement of the piston occurs in response to rotation of the screw.

14. The energy storage system of claim 13, wherein the actuator further comprises a transmission operably coupled between the screw and the motor.

15. A method of operating an energy storage system, the method comprising:
    providing a reversible pump/motor;
    providing an accumulator containing pressurized working fluid and gas;

delivering the pressurized working fluid to the reversible pump/motor when operating as a motor;

receiving in the accumulator pressurized working fluid discharged by the reversible pump/motor when operating as a pump;

providing a reservoir containing gas;

transferring gas from the reservoir to the accumulator to increase the gas pressure in the accumulator; and transferring gas from the accumulator to the reservoir to decrease the gas pressure in the accumulator;

wherein transferring gas from the reservoir to the accumulator includes pumping gas from the reservoir to the accumulator using a pump.

16. The method of claim 15, wherein transferring gas from the accumulator to the reservoir includes pumping gas from the accumulator to the reservoir using the pump.

* * * * *